D. J. Martin,
Cage Trap,
Nº 66,980.  Patented July 23, 1867.

United States Patent Office.

DAVID J. MARTIN, OF COVINGTON, OHIO.

Letters Patent No. 66,980, dated July 23, 1867.

IMPROVEMENT IN ANIMAL-TRAPS.

*The Schedule referred to in these Letters Patent and making part of the same.*

TO ALL WHOM IT MAY CONCERN:

Be it known that I, D. J. MARTIN, of Covington, Ohio, have invented certain new and useful improvements in Animal-Traps; and I declare the following to be a full, true, and exact description of the same, reference being had to the accompanying drawings, and to the letters of reference marked thereon.

Figure 1:
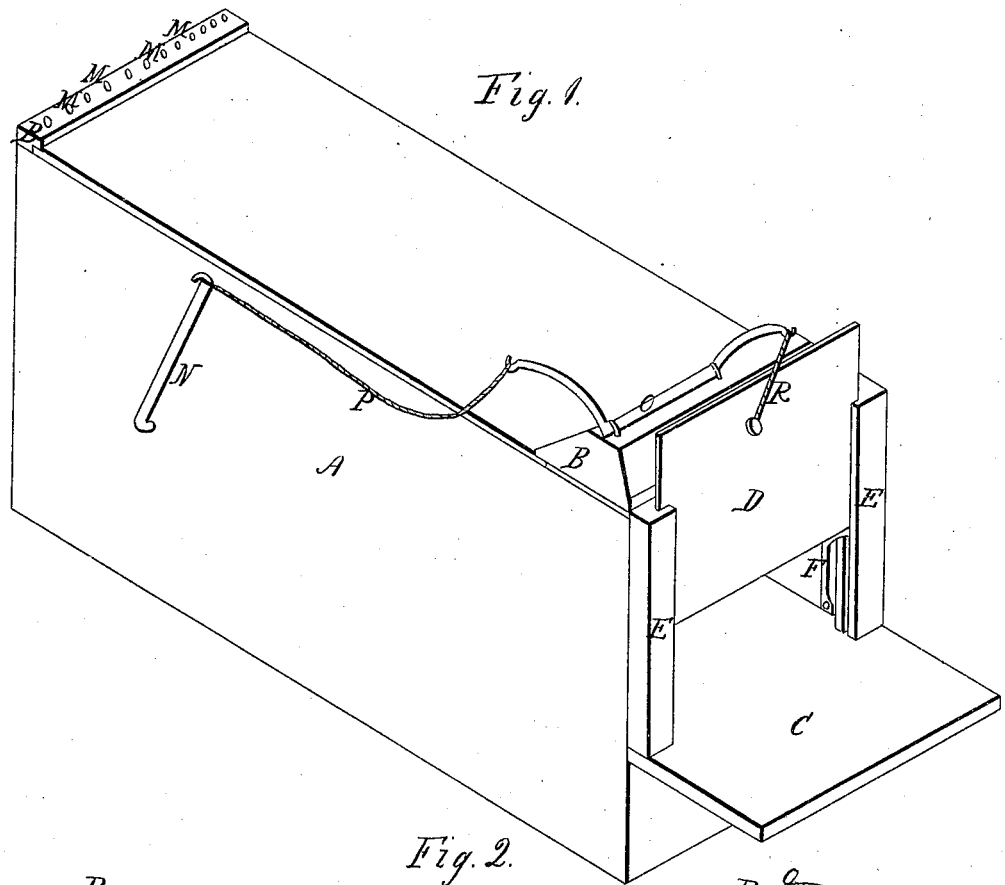
Figure 1 represents a perspective view of my trap.
Figure 2:
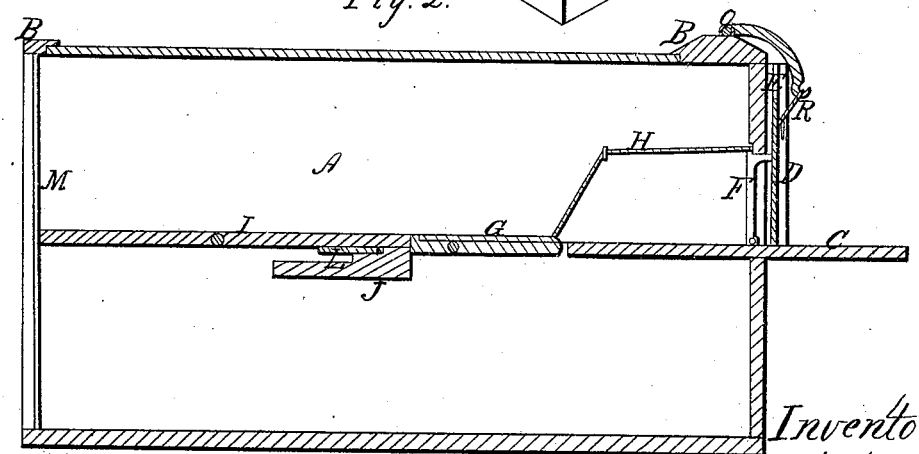
Figure 2 represents a section view of the same.

Letter A represents the frame of my trap, which is so constructed as to be divided into an upper and a lower compartment, (as shown in fig. 2,) and is also provided with a glass top, which is securely held in its place by the grooved cap pieces B B. Letter C represents an apron or platform, which extends to some distance beyond the front end of the trap, and is provided for the purpose of allowing the animal to get a view of the bait, which is placed on the inside of the trap. Letter D represents the door, which is placed at the front end of the trap, and is held in its place by and works in the grooved uprights E E. This door may be constructed of any desirable material. Letter F represents a catch, which is fastened to one side of the frame A, and should be made of some springy material, so that when it is drawn back for the purpose of allowing the door D to fall, as soon as the door is raised again it should spring back far enough to allow the door to rest upon its shoulder and to prevent it from closing. Letter G (fig. 2) represents a treadle, which is placed in the rear of the platform C, and is connected with the catch F by means of the cord H. This platform is so constructed as to form a trough for the purpose of holding the meal or bait, and is so balanced upon pivots that the slightest pressure upon its front part will cause it to tilt downwards. Letter I represents another tilting platform, which is placed immediately in the rear of but is larger than the first one, and is also balanced upon pivots. The front end of this platform rests upon the support J, and is provided with a small weight, L, sufficient to overcome the balance of the other end, and to retain it in its place. The rear end of the trap is closed sufficiently by means of the upright wires M to prevent an animal from escaping, and is open enough to allow the light to enter freely. Connected with the platform I is the arm N in such a way that when the platform is tilted, either up or down, it causes the arm to move backwards and forwards. Letter O represents a double crank, (as shown in fig. 1,) one arm of which is connected with the arm N, by means of the cord P, and the other end is connected with the door D by means of the cord R. This crank is placed upon the top of the front part of the trap.

The *modus operandi* is as follows: The bait is placed upon the treadle G, and the door raised high enough to allow it to rest upon the shoulder of the catch F. The trap is now ready for use. The animal jumps upon the platform C, and seeing the bait upon the inside of the trap ventures in. As soon as his weight presses upon the treadle G it tilts downward, drawing the catch F from under the door, by means of the cord H, when the door immediately falls and the animal is caged. Seeing light in the back end of the trap, and an apparent way of escape, he seeks an exit there, but as soon as he reaches the rear end of the platform I it tilts downwards and precipitates him into the lower compartment, when the weight L causes it to fall back into its proper position. In tilting downwards the arm N is drawn back, which tightens the cord P sufficiently to raise the door D, by means of the double crank O, high enough to again catch up the shoulder of the catch F, when the trap is again set and is ready for the next animal that comes. Thus each animal sets the trap for the other.

Having thus described my invention, what I claim, and desire to secure by Letters Patent, is—

1. The employment of the spring-trigger or catch F for the purpose of engaging the sliding-door D, in the manner specified.

2. In combination with the above I claim sliding-door D, cord H, treadle G, substantially as and for the purpose described.

In testimony whereof I set my hand in presence of two witnesses.

DAVID J. MARTIN.

Witnesses:
 G. W. RAUCH,
 RUSH REYNOLDS.